United States Patent
Messinger

(10) Patent No.: US 10,975,842 B2
(45) Date of Patent: Apr. 13, 2021

(54) WIND TURBINE PROPELLER REGULATOR TO PRODUCE UNINTERRUPTED ELECTRICITY AND LONGER BEARING LIFE

(71) Applicant: Samuel Messinger, Ramot Beit Shemesh Gimmel (IL)

(72) Inventor: Samuel Messinger, Ramot Beit Shemesh Gimmel (IL)

( * ) Notice: Subject to any disclaimer, the term of this patent is extended or adjusted under 35 U.S.C. 154(b) by 0 days.

(21) Appl. No.: 17/000,330

(22) Filed: Aug. 23, 2020

(65) Prior Publication Data
US 2020/0392943 A1   Dec. 17, 2020

Related U.S. Application Data

(63) Continuation-in-part of application No. 16/548,848, filed on Aug. 23, 2019.
(Continued)

(51) Int. Cl.
*F03D 7/02* (2006.01)
*F03D 1/06* (2006.01)

(52) U.S. Cl.
CPC ......... *F03D 7/0276* (2013.01); *F03D 1/0675* (2013.01); *F05B 2270/1014* (2013.01);
(Continued)

(58) Field of Classification Search
CPC ..... F03D 9/14; F03D 9/16; F03D 9/13; F03D 13/25
See application file for complete search history.

(56) References Cited

U.S. PATENT DOCUMENTS 3,942,026 A   3/1976   Carter
4,247,253 A   1/1981   Seki et al.
(Continued)

FOREIGN PATENT DOCUMENTS

EP   2565475 A2   3/2013
JP   2002106459 A * 4/2002

OTHER PUBLICATIONS

Harris, T. et al. (2009) "Wind Turbine Design Guideline DG03: Yaw and Pitch Rolling Bearing Life", National Renewable Energy Laboratory, Technical Report NREL/TP-500-42362: 1-63.
(Continued)

*Primary Examiner* — Juan G Flores
(74) *Attorney, Agent, or Firm* — Carrie M. Stroup

(57) ABSTRACT

A wind turbine system that provides continuous rotation of a propeller, to prevent stopping or critical slowing of the propeller to, which causes damage to the bearing and gear assembly, and shortens the turbine life. The wind turbine propeller includes at least one hollow blade having a pair of reservoirs at the top and bottom of at least one blade; a hydraulic pump and a wireless control unit configured between the reservoirs; a motion sensor, aneunometer, and heater and/or pump battery (optional). The wireless control unit commands the hydraulic pump: 1) to manipulate the fluid present within the reservoirs to create an imbalance within the hollow propeller to prevent it from stopping in low or no wind conditions; and 2) to slow down in high wind conditions. One embodiment comprises two short hollow blades with the pump, reservoirs, and control unit, and two normal long blades.

18 Claims, 12 Drawing Sheets

Related U.S. Application Data

(60) Provisional application No. 62/722,899, filed on Aug. 25, 2018.

(52) U.S. Cl.
CPC .... *F05B 2270/327* (2013.01); *F05D 2240/24* (2013.01); *F05D 2240/30* (2013.01)

(56) References Cited

U.S. PATENT DOCUMENTS

| | | | |
|---|---|---|---|
| 4,311,434 A | 1/1982 | Abe | |
| 4,311,918 A | 1/1982 | Vaseen | |
| 4,450,364 A | 5/1984 | Benoit | |
| 5,586,417 A | 12/1996 | Henderson | |
| 5,663,600 A | 9/1997 | Baek et al. | |
| 6,616,402 B2 | 9/2003 | Selsam | |
| 7,018,166 B2 | 3/2006 | Gaskell | |
| 7,144,222 B2 | 12/2006 | Lanni et al. | |
| 7,241,105 B1 | 7/2007 | Vanderhye et al. | |
| 7,352,076 B1 | 4/2008 | Gabrys | |
| 7,432,686 B2 | 10/2008 | Erdman | |
| 8,298,115 B2 | 10/2012 | Ciszak | |
| 8,443,571 B2* | 5/2013 | Tadayon | F03D 13/10 52/745.18 |
| 8,672,625 B2* | 3/2014 | Becker | F03D 7/0292 416/1 |
| 9,523,353 B2 | 12/2016 | Frank | |
| 2005/0012339 A1 | 1/2005 | Mikhail et al. | |
| 2007/0127858 A1 | 6/2007 | Nakagawa et al. | |
| 2009/0097981 A1 | 4/2009 | Gabrys | |
| 2009/0218823 A1 | 9/2009 | Wu et al. | |
| 2013/0307277 A1* | 11/2013 | Rosenvard | F03D 13/25 290/55 |
| 2017/0254316 A1* | 9/2017 | Philipsen | F03D 80/40 |
| 2019/0145381 A1* | 5/2019 | Gbadamassi | F03D 13/35 73/455 |

OTHER PUBLICATIONS

Manwell, J.F. et al. (2002) Chapter 6, "Wind Turbine Design", Wind Energy Explained—Theory, Design and Application, p. 1-73.

Carbon Trust, (2014) "Appraisal of the Offshore Wind Industry in Japan", pp. 1-103.

Zhussupbekov, A. et al., (2016) "Design of Foundation for Wind Turbine with Analysis by Finite Element Method", Proceedings of 13th Baltic Sea Geotechnical Conference, pp. 196-200.

Lu, Bin et al. (2009) "A Review of Recent Advances in Wind Turbine Condition Monitoring and Fault Diagnosis", IEEE, 978-1-4244-4936, pp. 1-7.

Aymane, E. et al. (2017) "Savonius Vertical Wind Turbine: Design, Simulation, and Physical Testing". School of Science and Engineering, Alakhawayn University, pp. 1-91.

Larcroix, A. et al. (2000) "Wind Energy: Cold Weather Issues", Univ. of MA at Amherst, Renewable Energy Research Lab., pp. 1-17.

Thresher, R. et al. (1984) "A Computer Analysis of Wind Turbine Blade Dynamic Loads", Solar Energy Research Institute, Golden, Colorado: 1-12.

Perkins, F.W. and Cromack, D.E. (1978) "Wind Turbine Blade Stress Analysis and Natural Frequencies", Univ. of MA Amherst: 1-143.

Quandt, Gene (1996) "Wind Turbine Trailing-Edge Aerodynamic Brake Design", National Renewable Energy Lab.: 1-87.

Johnson, Gary L. (2001) Chapter 4: Wind Turbine Power, Energy, and Torque:, Wind Energy Systems: 1-54.

Engstrom, S. et al. (2010) "Tall towers for large wind turbines", Elforsk rapport 10:48, pp. 1-60.

Office Action, U.S. Appl. No. 16/548,848, FOAM, dated Dec. 11, 2019.

Office Action, U.S. Appl. No. 16/548,848, Final Rejection, dated Apr. 29, 2020.

Office Action, U.S. Appl. No. 16/548,848, AFCP 2.0 Rejection, dated Apr. 29, 2020.

\* cited by examiner

WIND TURBINE PROPELLER REGULATOR TO PRODUCE UNINTERRUPTED ELECTRICITY AND LONGER BEARING LIFE

CROSS-REFERENCE TO RELATED APPLICATIONS

The present application is a continuation-in-part of U.S. patent application Ser. No. 16/548,848 filed on Aug. 23, 2019, which claim priority to U.S. provisional application Ser. No. 62/772,899 filed on Aug. 25, 2018. The entire contents of these disclosures are hereby incorporated by reference in their entirety.

FIELD OF THE INVENTION

The present invention relates to a wind turbine system. More particularly, the present invention relates to a wind turbine system which allows continuous motion of a propeller when wind speeds are slow or the propeller is stationary due to no wind or there is a resolution of wind forces to stop the propeller. This control of propeller rotation will generate a more uniform predicable manufacture of electrical current and result in a longer life of the system.

BACKGROUND OF THE INVENTION

A wind turbine is a device that converts the kinetic energy of wind into electrical energy using a simple principle that the energy in the wind rotates the propeller like blades of the rotor of the turbine, which is normally connected to the rotor shaft of the generator using the main shaft and which spins the rotor shaft of the generator creating electricity from the kinetic energy of the wind. Based on the design of the rotor, wind turbines are conventionally classified as Horizontal axis wind turbine and Vertical axis wind turbine. The rotation of the propellers is often 15 rpm, which is converted through mechanical gears and bearings to 1800 rpm to produce electricity. To date the propellers have been designed exclusively for their aerodynamic properties, such as for aircraft application.

Most of the large wind turbines use a wind sensor coupled with the servo motor on the top of the nacelle to turn the turbine into the wind so that rotor can rotate. However, due to the large size and heavy weight of the propeller (often weighing 36,000 lbs. each) a wind turbine requires appreciable wind force to rotate the blades. Wind currents are unpredictable and are of irregular strength. This can lead to occasional halt of propeller rotation altogether either by lack of wind or resolution of conflicting winds resulting in a zero-sum net effect on the rotor. Stagnation of rotation creates metal to metal contact, i.e., scuffing, between the rolling elements of the bearing due to the lack of a lubricating film build up. The same phenomenon takes place at critically low revolutions-per-minute (RPMs). This low rpm rotation or stoppage results in the need for more repairs and maintenance and the loss of electricity production and a shorter service life of the system.

Wind turbines are designed to have a service life of 20 years, but bearings and other parts fail from the erratic nature of the wind causing the rotor to stop and start and accelerate wildly. Propellers are huge, e.g. often 250 feet in length, and weigh 20 tons or more; and they are getting larger and heavier. The propellers usually rotate from 5-20 rpm and 15 rpm is often said to be the ideal speed. However, the wind is erratic and not always predictable. Often the wind is such that the propeller stops completely. This causes metal to metal contact with bearings and other parts and causes damage to the integrity of the metal parts in the bearings. Fretting occurs and scuffing as well as lubricant starvation. The bearing life is severely compromised as continuous uninterrupted elasto-hydrodynamic (EHL) lubrication is essential for normal L10 bearing predicted life.

Further, as mentioned above, the upper limit of safe electricity generation is 25 rpm, which is normally exceeded during typhoons, hurricanes and in-climate weather. Places like some parts of the United Kingdom (UK) where there are windy conditions, the probability of accidents that may cause damage to life and properties is significantly increased. In the UK alone, there have been 1500 accidents recorded by the Renewable UK due to heavy winds, which resulted in 4 deaths and 300 injured in the last five years. In 2011 in England, there were 163 wind turbine accidents and 14 people were killed. A search of catastrophic wind turbine failures in Japan reveals a similar magnitude of the problem. Caithless Wind Farm Information Forum cites many specific accident instances, some of which cite "multiple amputations" witnessed by a horrified coworker. Also documented are 221 separate instances where propellers broke and were thrown over $\frac{4}{5}$ of a mile, sometimes through roofs and building. Also documented are 168 wind turbine fires and 95 times chunks of ice were thrown off the propellers in 2005. Sadly Energy/Buz Magazine cites that in 2011 a majority of wind turbines have come off warranty. Statistics in Japan are closely guarded but the government has announced periodic safety inspections in response to accidents in cooperation with Japan Wind Power Association (JPWA).

Therefore, there exists a need for a wind turbine device and system that can control and keep the speed of rotation at a desired safe speed to significantly reduce or eliminate the chances of accidents due to high wind; and, prevent stoppage of the turbine, which causes gear and bearing excessive wear due to low or no wind. Further, there exists a need for a wind turbine device or system that does not allow rotation of the propeller beyond the maximum and minimum rotation speed limit of the turbine. Also, there is a need of wind turbine to produce a constant flow of electricity to maximize electrical production.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The subject matter of present invention discloses a wind turbine system with a novel hollow propeller and propeller blades that are capable of rotating even when the speed of wind is low or when the propeller is stationary due to no wind or a resolution of forces to stop the propeller. The wind turbine of the present invention comprises of a novel propeller assembly made of plurality of hollow blades and a hub. Each of the plurality of hollow blades of the hollow propeller further comprises of a pair of fluid reservoirs at the tip of the hollow blade and at the stem near the hub of the hollow blade, configured within the hollow space within the hollow blades and connected through the hydraulic pump. In another embodiment, each blade of the present invention can comprise more than two opposing reservoirs, e.g. three reservoirs. Each of the plurality of hollow blades of the hollow propeller further comprises a wireless control module communicably coupled to the hydraulic pump.

One embodiment comprises three hollow blades of equal length, each blade comprising: a hydraulic pump connected to a wireless control unit; and two opposing end reservoirs.

Another embodiment comprises: two short hollow blades each comprising a hydraulic pump connected to a wireless control unit and two opposing end reservoirs; and two normal long blades. According to an embodiment, the wind turbine system further comprises a wireless shaft rotation monitor sensor attached to the main shaft of the hollow propeller and an anemometer configured over a nacelle of the wind turbine system that respectively monitors angle and position of the shaft, and hence the angle and position of the blades of the propeller and the speed of wind and sends that data to the wireless control module within the hollow propeller. The wireless control module in turn directs the hydraulic pump to transfer a fluid back and forth within the reservoirs of the hollow blade creating an imbalance within the hollow blade making the hollow propeller to keep rotating at a desired speed in any kind of wind conditions. During rotation, each propeller so configured will have fluids in each hollow propeller blade, which is manipulated to different locations in the rotation cycle to facilitate the movement of the entire assembly. Finite element computer simulation, using ANSYS®, computational software was used for finite element analysis to design the blades with animations of the deformation and Von-Misses stress were performed to demonstrate the ability of the present invention to accomplish this. ABAQUS® or similar computational theoretical software is also used.

According to one embodiment, the wind turbine fluid manipulation system is capable of a slowing action in conditions of heavy wind when the speed of rotation reaches a maximum limit. The wind turbine system manipulates the fluid in the fluid reservoirs within the hollow blades of the hollow propeller in a manner that decreases the speed of rotation of the hollow propeller in the high wind conditions and keeps the rotation of the turbine at a desired average speed to decrease the chances of an accident and to keep the electricity generation at a safe rpm.

According to one or more embodiments, the hydraulic pump with the wireless control unit can be located anywhere within the blade as long as the fluid line is connected to the pump and depending on the geometry and particular design constraints. In the exemplary figures of the present invention, it is illustrated in the middle of the blade.

According to one or more embodiments, more than two reservoirs are in each blade, such as three of four reservoirs.

According to one or more embodiments, one or more blades comprise the pump and wireless control unit, and reservoirs of the present invention, while the other blades are hollow to the degree to comprise a comparable weight.

The present invention further comprises a wind turbine system and method of use for continuous motion of a turbine; the wind turbine system comprising: a hollow propeller having a plurality of hollow blades connected to a central hub; at least one fluid reservoir configured within each of the plurality of hollow blades, each fluid reservoir located at a tip and at a stem near the hub of the hollow propeller, wherein the at least one fluid reservoir is capable of collecting and storing a fluid; at least one pump configured within each of the plurality of hollow blades, wherein the at least one pump is connected to the at least one fluid reservoir by a fluid line for transferring the fluid back and forth within the at least one fluid reservoir; at least one wireless control unit communicatively coupled with the at least one pump to control the action of the at least one pump; at least one wireless shaft rotation monitor sensor attached to a propeller shaft and configured to monitor and transmit angle and position of the propeller shaft to the at least one wireless control unit; and at least one anemometer attached at a rear portion of a nacelle of the wind turbine system and configured to monitor and transmit speed of wind to the at least one wireless control unit. At least one pump is configured to: pump the fluid into the at least one fluid reservoir at the top of the rotation cycle as a counter-weight resulting in movement of the hollow propeller downwards, in a low or a no wind condition; pump the fluid out of the at least one fluid reservoir at the lowest point of the hollow propeller's rotation revolution to complete a cycle; and to manipulate fluid within the at least one fluid reservoir to slow down the hollow propeller in reverse condition when the hollow propeller is at a maximum critical speed.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that the same numeral in any subsequent drawing herein.

DETAILED DESCRIPTION OF INVENTION

Figure 1:
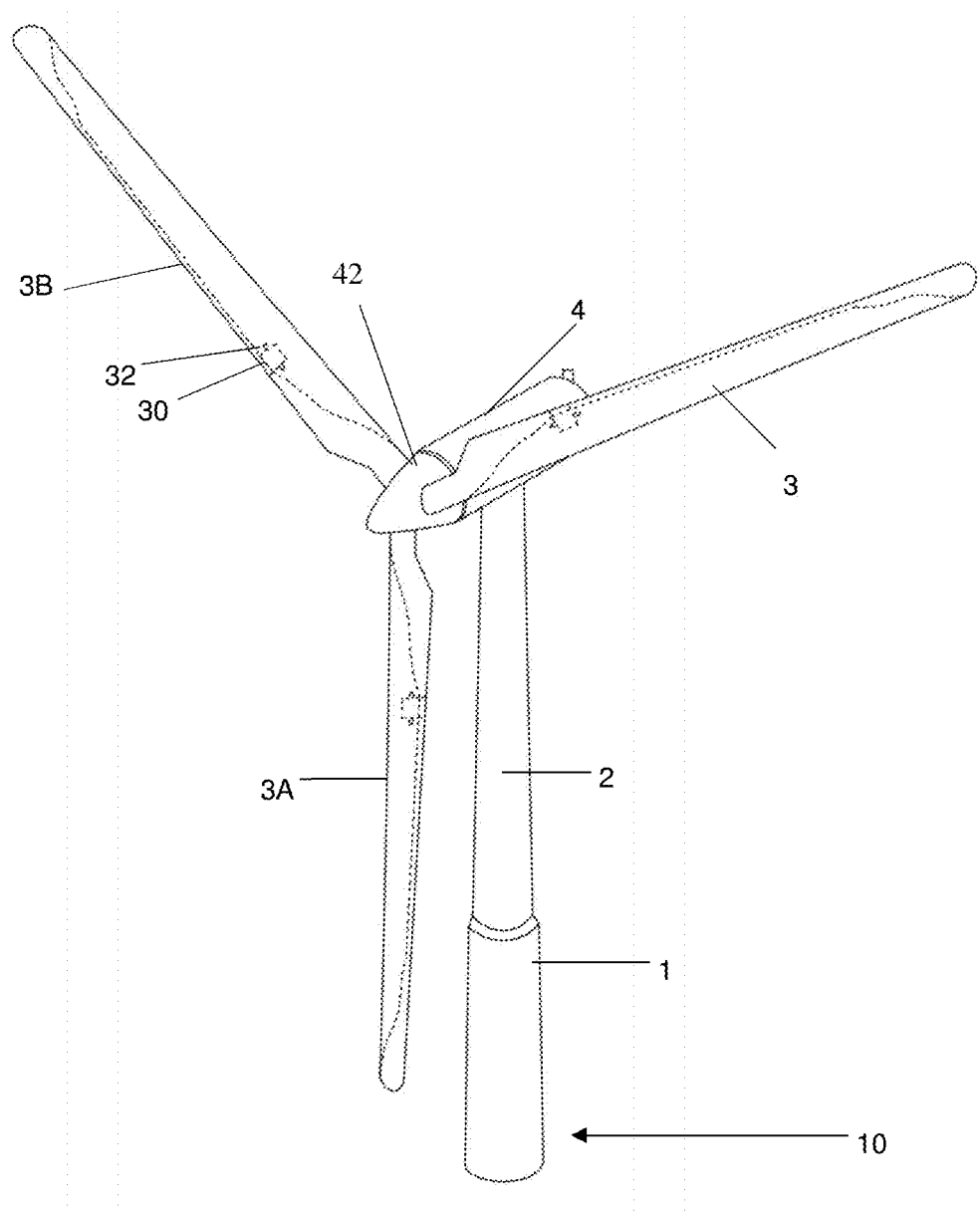
FIG. 1 illustrates a left side perspective view of the wind turbine with a unique hollow propeller disclosed herein in accordance with an embodiment of the present invention.

The present invention overcomes the aforesaid drawbacks of the above, and other objects, features and advantages of the present invention will now be described in greater detail. Also, the following description includes various specific details and is to be regarded as merely exemplary. Accordingly, those of ordinary skill in the art will recognize that: without departing from the scope and spirit of the present disclosure and its various embodiments there may be any number of changes and modifications described herein.

"Propeller" as described in the present invention may be defined as essentially a hub and blades. The blade shape is defined by profiles, chosen for their aerodynamic performance. The hollow blades contain multiple compartments for fluids, the number of which will depend on the structural and the dynamic needs of the geographic location of the wind turbine. The hollow propeller of the present invention further comprises, in an embodiment, three of more compartments to host the fluid. These compartments need not be of the same size of geometry; and all are contained within the propeller skin.

As used herein, the term "low wind speed" is the range of less than a low critical speed at which at least one pump may be activated by a wireless control unit (e.g. wireless transmission automatedly or manually by a wind farm operator) within at least one blade, to increase or maintain a steady product of electricity. In an embodiment, the "low wind speed" critical level is from 0 km/hr (no wind) to about 15 km/hr. It is noted that in other embodiments, the "low wind speed may be set per the International Electrotechnical Commission (IEC) standards well known in the art, or other established standard specific to a region (e.g. less than about 37.5 m/s, which is about 133 km/hr).

As used herein, the term "maximum speed" or "maximum propeller speed" or "critical speed" all refer to the high critical rotational speed of the turbine propeller above which the turbine may be damaged. At this point, at least one pump is activated within a blade to slow the propeller rotational speed (e.g. see FIG. 5B). In an embodiment, the maximum or critical propeller speed is about 25 revolutions-per-minute (rpm's).

The term "maximum wind speed" called the survival speed above which above which the turbine will suffer damage. This is in the range of 40 m/s (89 mph) to 72 m/s (161 mph). The most common survival speed is 60 m/s (134 mph). likewise refers to the maximum wind speed at which above this level, damage to the turbine may occurs. At this point, at least one pump is activated within a blade to slow the propeller rotational speed (e.g. see FIG. 5B). In an embodiment, the maximum wind speed is about less than 90 km/hr.

According to an embodiment, the present invention provides a wind turbine system that is capable of creating imbalance, and controlling the inertia of the rotating structure of the hollow propeller to sustain rotation even when the speed of wind is low, or the propeller is stationary due to stagnation of the wind or a resolution of forces to stop the propeller (e.g. when equal and opposite wind forces cancer each other out). Further, the present invention provides a wind turbine system that prevents stopping or critical slowing of the hollow propeller that causes damage to the bearing and gear assembly and shortens the life of the wind turbine system. According to an embodiment, the system of present invention also works in reverse condition to slow down the motion of the hollow propeller when speed increases a maximum speed limit of 25 rpm, which is considered dangerous in most wind turbine applications.

According to an embodiment, the system of present invention is a wind turbine system for continuous motion of a turbine comprising a novel hollow propeller, at least one fluid reservoir, at least one pump, at least one wireless control unit, at least one wireless shaft rotation monitor sensor and at least one anemometer. The hollow propeller has a plurality of hollow blades and a hub and having plurality of fluid reservoirs at the end (tip) and at the stem near the hub of the hollow propeller within the hollow space of the hollow propeller blades to manipulate a fluid back and forth within the hollow blade of the hollow propeller to create imbalance and to keep the hollow propeller in rotation at the desired speed, even in a less or no air situation or in high air situations.

According to an embodiment, the wind turbine system of the present invention comprises of at least one pump communicatively coupled with a wireless control unit, where the pump connects the plurality of the fluid reservoirs within each of the hollow blades of the hollow propeller to direct the flow of the fluid within the reservoir of blades to control and keep the motion of the propeller at desired speed in low, high or no wind conditions. The at least one pump is, but not limited to, a hydraulic pump.

Further, the wind turbine system of the present invention includes a reserve tank with or without a fluid heater, located within the nacelle of the wind turbine that collects fluid from all the reservoirs of the hollow blades when the wind speed and speed of rotation of the propeller is normal and does not require external efforts for its motion.

According to one embodiment, the wind turbine system of the present invention comprises a wireless shaft location monitor sensor which is connected to the shaft of the wind turbine and an anemometer that are configured to monitor speed of the wind and rotation of the shaft, and which sends and activation signal to the wireless control of the hydraulic pump to: transfer the fluid from the bottom reservoir to the top reservoir, and fill the top reservoir of the hollow blade at the top of the rotation cycle.

According to one more embodiment of the invention, the wind turbine system of present invention may further comprise a heating mechanism such as, an electromechanical heating unit able to heat the fluid to a temperature able to prevent freezing of the wind turbine and maintain continuous rotation of the hollow propeller in cold weather. In an embodiment, the heating unit is connected to the reserve tank within the nacelle. In another embodiment, the heating unit is connected to one or both reservoirs within a blade. In another embodiment, the heating unit is connected to the hydraulic pump 30 with the connection unit 9.

Figure 2:
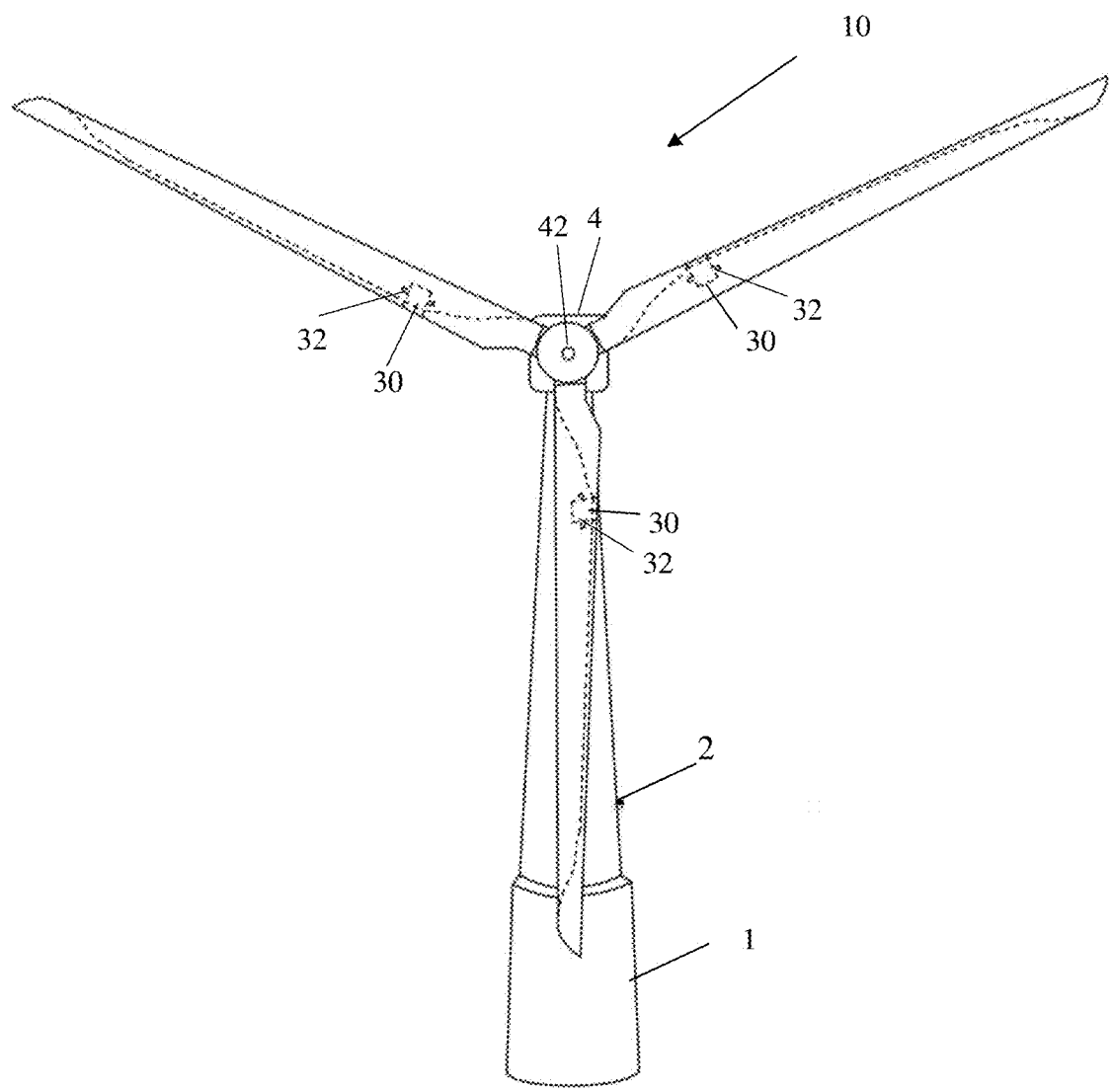
FIG. 2 illustrates a front elevational view of the wind turbine with unique hollow propeller of FIG. 1 in accordance with an embodiment of the present invention.

Now, referring to FIGS. 1 and 2 that exemplarily illustrate a left-hand side perspective view and a front elevational view, respectively, of the wind turbine system 10 with a unique hollow propeller with the plurality of hollow propeller blades (3, 3A, 3B) in accordance with an embodiment of the present invention. According to present embodiment, the wind turbine system 10 is fixed on the ground using primary or base support 1 that supports and holds the wind turbine steady and in fixed position; a secondary support member 2 that connects and supports the plurality of hollow propeller blades (3, 3A, 3B) to a hub 42, nacelle 4 and other top units of the system 10 with the primary support 1. As illustrated in FIG. 2, a connection unit 9 housing: a hydraulic pump 30 with a heater 62 with a wireless control unit 32, which is configured within at least one the hollow propeller blades (FIGS. 2, 3, 3A, 3B) to generate a back and forth transfer of the fluid within the at least one fluid reservoir (FIGS. 4, 8A, 8B) of the hollow blades (FIGS. 2, 3, 3A, 3B) of the hollow propeller.

Figure 3:
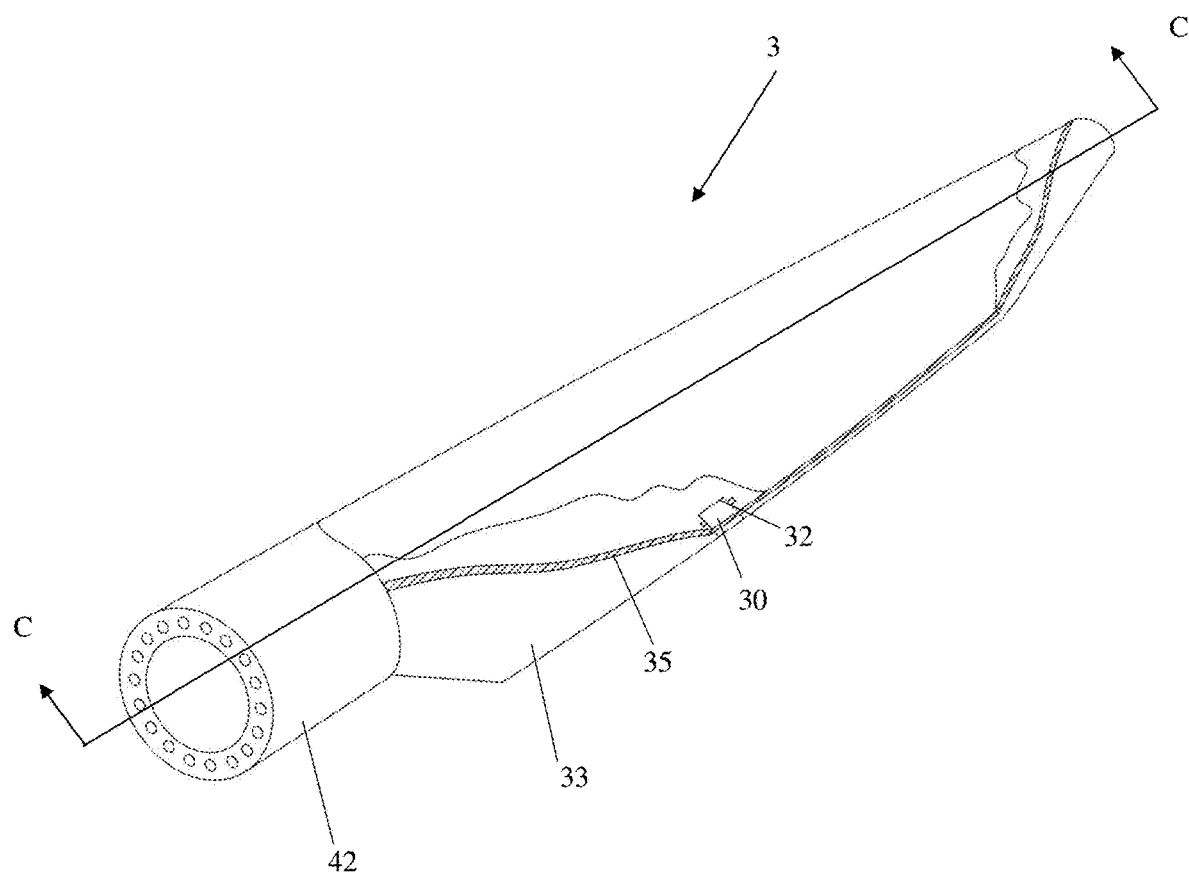
FIG. 3 illustrates a perspective view of one detached unique hollow propeller blade disclosed herein in accordance with an embodiment of the present invention.
Figure 4:
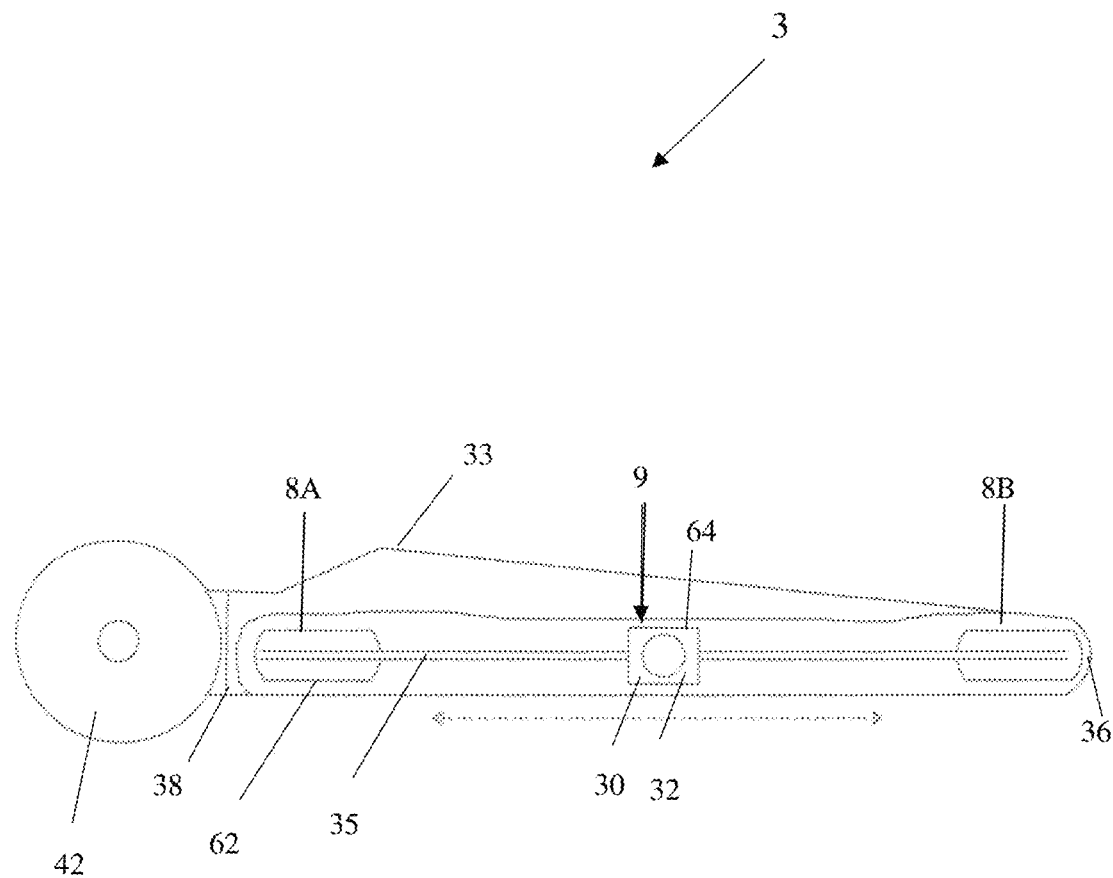
FIG. 4 illustrates a longitudinal cross-sectional view of FIG. 3 taken along line C-C of the unique hollow propeller blade illustrating the inner components in accordance with an embodiment of the present invention.
Figure 6:
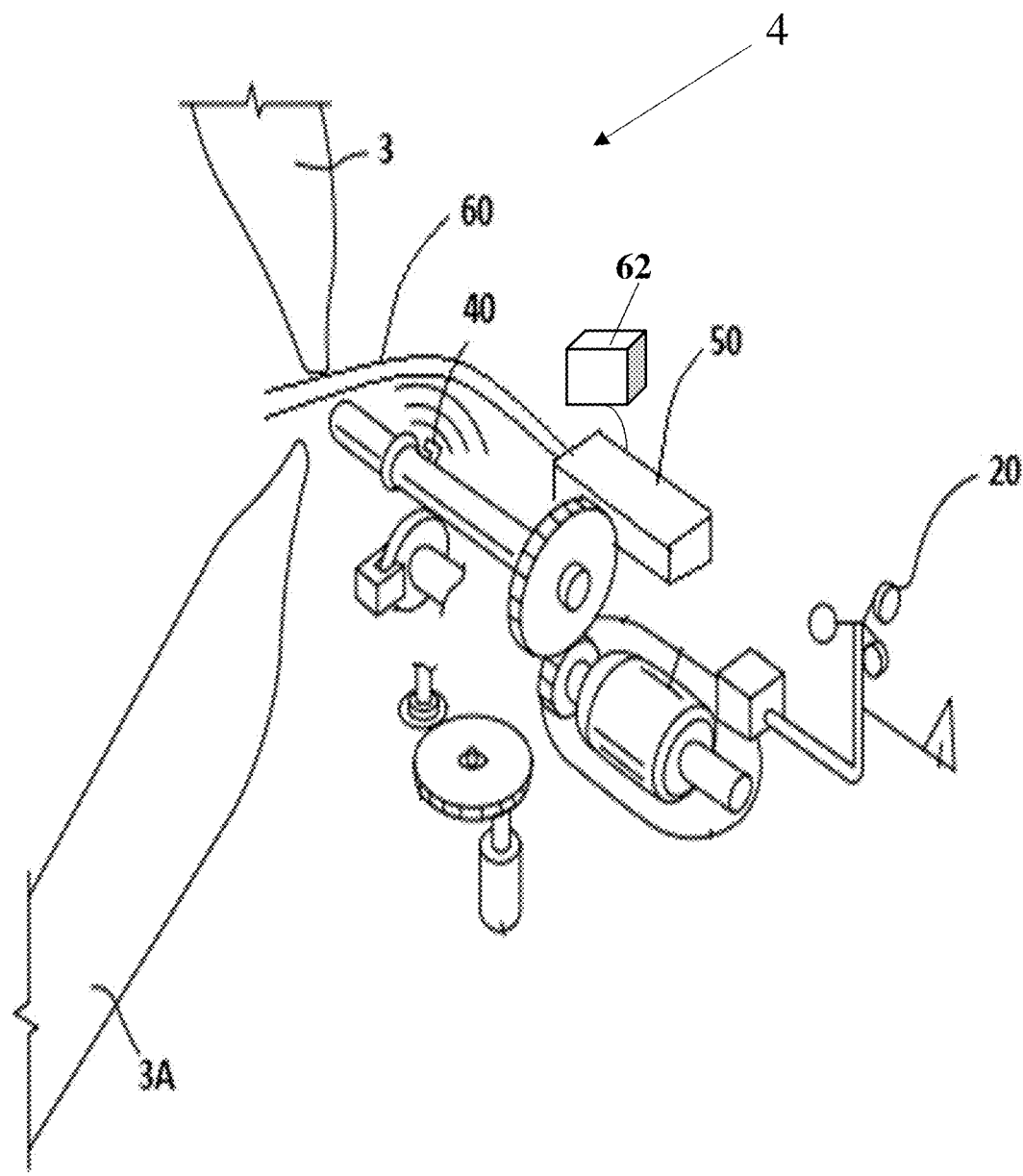
FIG. 6 illustrates an exploded view of the nacelle assembly of the wind turbine system comprising the wireless shaft rotation monitor sensor, a fluid heater, and the anemometer in accordance with an embodiment of the present invention.

FIG. 3 illustrates a perspective view of a detached hollow blade; and FIG. 4 is a longitudinal cross-sectional view taken along line C-C of FIG. 3 to illustrate the internal blade components of the present invention. The hollow propeller blade 3 according to present embodiment comprises a hollow body 33 having a pair of opposing fluid reservoirs (8A, 8B) within the hollow section of the hollow propeller blade 3 at the top end tip 36 and bottom end stem 38 of the hollow propeller blade 3; and a middle connection unit 9 housing a hydraulic pump 30 with a wireless control unit 32 configured between both the fluid reservoirs (8A, 8B). The connection unit 9 may further comprise a fluid heater 62 and/or a rechargeable battery 64 to power the pump. Alternatively, and as illustrated in FIGS. 4 and 6, the fluid heater 62 may reside in a fluid reservoir or in the nacelle. The wireless control unit 32 receives wind speed and propeller shaft position data from the anemometer 20 and sensor 50 (see FIG. 6) and controls the operation of pump 30 according to that received data. The fluid reservoirs 8A, 8B are connected by a fluid line 35 that runs through the hydraulic pump 30.

Figure 5A:
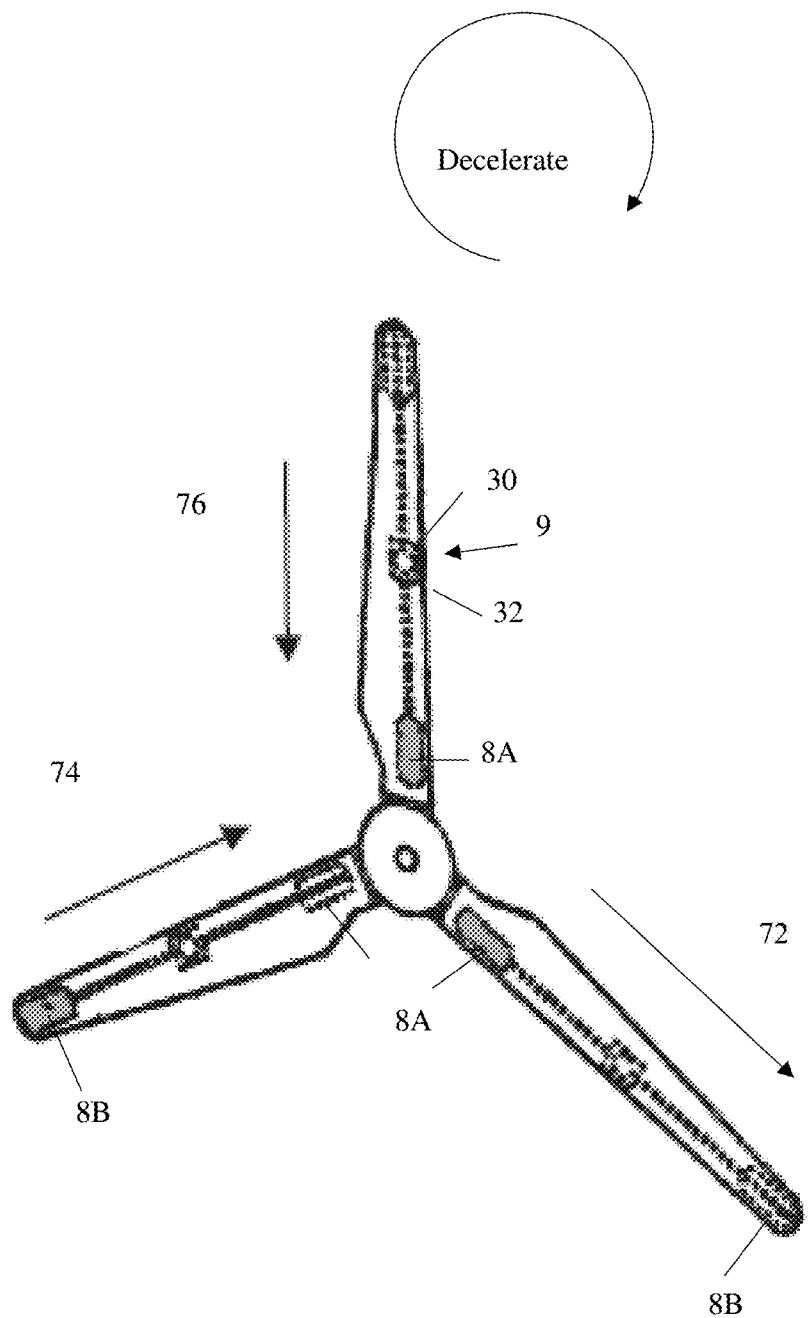
FIG. 5A illustrates a front view of a method of decreasing the speed of rotation of a propeller by moving the fluid within the reservoirs between the blades' tip and stem in the direction of the arrows based on the location of each blade.
Figure 5B:
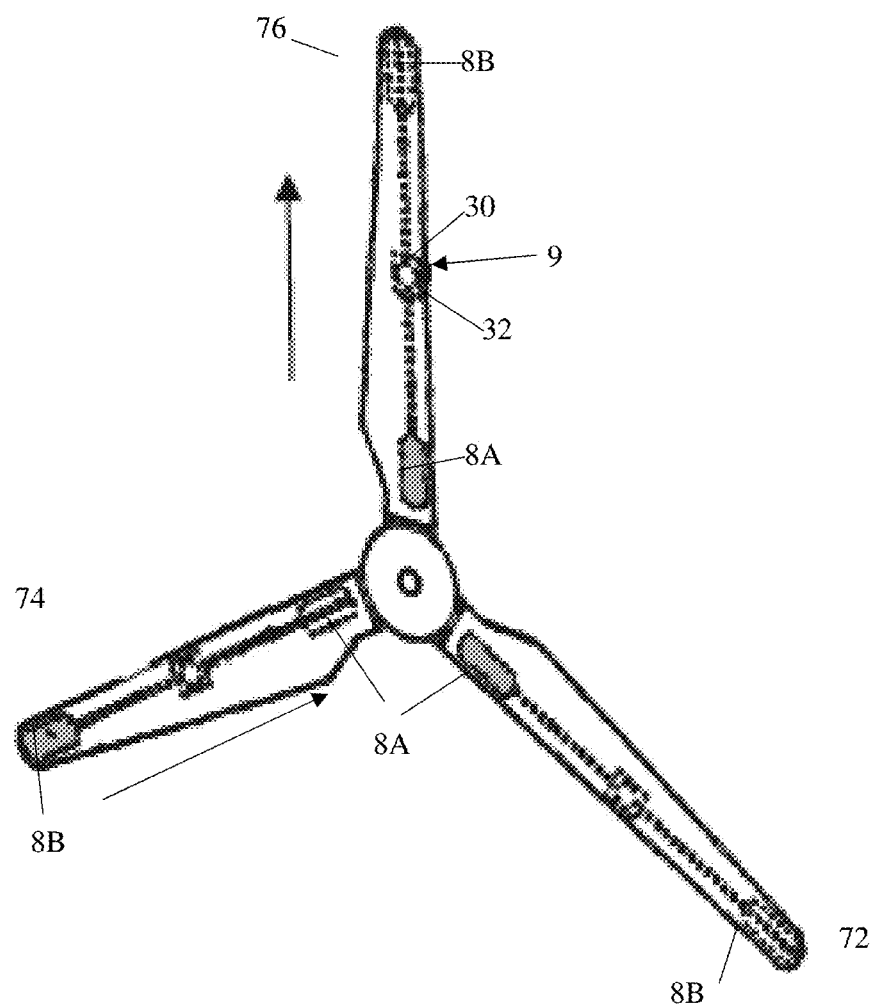
FIG. 5B illustrates a method of increasing the speed of rotation of a propeller by moving the fluid within the reservoirs between the blades' tip and stem in the direction of the arrows based on the location of each blade.

Now referring to FIGS. 5A and 5B that illustrate front views of the deceleration and the acceleration procedures of the propeller which rotates clockwise when wind conditions allow, and the direction of flow of the fluid within the blades. According to one embodiment illustrated in FIG. 5B for speeding the propeller, the mode of working of the internal hydraulic of the hollow propeller is described as: when the hollow propeller slows to a critical speed due to low wind (i.e. less than 15 km/h), the wireless control unit 32 of the hollow blade 76 commands the hydraulic pump 30 (e.g. within the connection unit 9) to pump the fluid into the fluid reservoir 8B at the top of the propeller cycle to increase the effective weight of that hollow propeller, and hence its potential energy, and causes the blade and to accelerate the down speed. At a lower point in the revolution cycle at blade 74, the wireless control unit 32 commands the hydraulic pump 30 to pump out the fluid of the top/tip fluid reservoir 8B into the bottom/stem fluid reservoir 8A and into the reserve tank 50 within the nacelle 4 (see FIG. 6) of the wind turbine to decrease the weight of the blade. The process is repeated as needed (with controlling the amount of fluid needed and administered through each blade), to keep the rotation per minute (rpm) of the hollow propeller at a desired, and optimized, count.

Moreover, according to an embodiment of the present invention as illustrated in FIG. 5A for slowing down the propeller, the wind turbine system is also capable of manipulating the fluid in the fluid reservoirs of hollow propeller blades to slow down the hollow propeller when the speed of the wind is more than a 90 km/h, or the speed of rotation of the hollow propeller is more than the maximum limit of 25 rpm. In blade 72, the hydraulic pump 30 moves fluid into the fluid reservoir 8B at the blade tip to increase the blade weight, torque, and thus rpms. Concurrently, blades 74 and 76 decrease the weight of the blade by pumping fluid from the tip 8B to the stem reservoir 8A.

FIG. 6 illustrates an exploded view of the nacelle 4 of the wind turbine system comprising the wireless shaft rotation monitor sensor 40 and the anemometer 20. The wireless shaft rotation monitor sensor 40 is connected to the shaft along with a wind anemometer 20 in the rear portion of nacelle. The wind anemometer 20 may monitor wind speed and shaft rotation, which may activate the hydraulic pumps to fill the hollow propeller blades at the top of the rotation cycle. Further, the wind turbine system of the present invention includes a reserve tank 50 within the nacelle of the turbine that is connected with the reservoirs of the hollow blades through a connection member 60 and collects fluid from all the reservoirs of the hollow blades when the wind speed and speed of rotation of the hollow propeller is normal and does not require external efforts for its motion.

According to one more embodiment of the invention, the wind turbine system of present invention may further comprise a heating mechanism such as, an electromechanical heating unit 62, to heat the fluid to a temperature able to prevent freezing of the wind turbine 10 and maintain continuous rotation of the hollow propeller in cold weather. In an embodiment, the heating unit 62 is connected to the reserve tank 50 within the nacelle 4. In another embodiment, the heating unit is connected to one or both reservoirs within a blade (e.g. see FIG. 4, 62).

According to another embodiment of the present invention, the three propeller blades may have the same design with a fluid reservoir and wireless operated pump self-contained therein; however, in actual operation only one propeller blade may need to be activated. The other two propeller blades in another embodiment can have fake reservoirs just to keep the weight the same. Further, there may be a rechargeable battery 64 which is configured to operate the hydraulic pump within the hollow propeller of the wind turbine system (e.g. see FIG. 4, 64).

Figure 7:
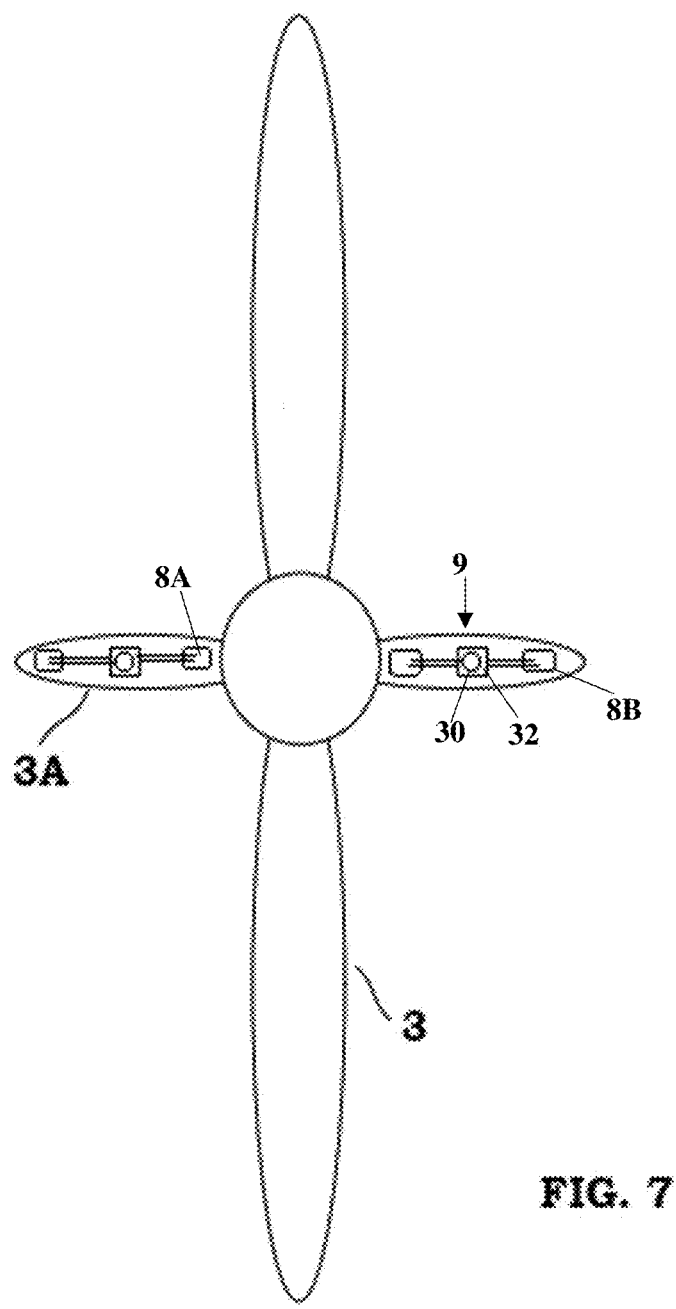
FIG. 7 illustrates another exemplary embodiment of a propeller with a pair of normal long symmetrical blades in between two shorter hollow blades of the present invention to control the speed of the propeller rotation.

FIG. 7 illustrates another exemplary embodiment of a propeller of the wind turbine system with a pair of symmetrical long blades 3 in between two shorter hollow blades 3A of the present invention to manipulate the rotation. According to an embodiment, the hollow propeller is made of a pair of opposing symmetrical long blades 3 that are constructed of traditional material (i.e. what is normally used in the state of the art) or are hollow; and a pair of opposing symmetrical short hollow blades 3A in between the pair of symmetrical long blades 3. Short blades 3A each comprise: at least one fluid reservoir (preferably two) and a wirelessly control unit connected to a hydraulic pump that manipulates fluid within a fluid line that runs between the reservoir(s) and the pump. This system creates an imbalance in the movement of the propeller to continuously rotate the propeller even in no wind or low wind conditions. According to the exemplary embodiment illustrated in FIG. 7, the short blades 3A of the propeller each comprise: two opposing fluid reservoirs, 8B on the blade tip and 8A on near the propeller stem; a centered hydraulic pump 30 connected to a wireless control unit 32, both housed within a connection unit 9; and a fluid in a fluid line 35 that runs between reservoirs 8A, 8B and through the pump 30. The system allows manipulation of the fluid within the short blades 3A to keep the propeller rotating in no wind conditions, and to forcefully decrease and maintain the speed of rotation in high wind conditions.

Retrofitting Existing Turbine

Figure 8A:
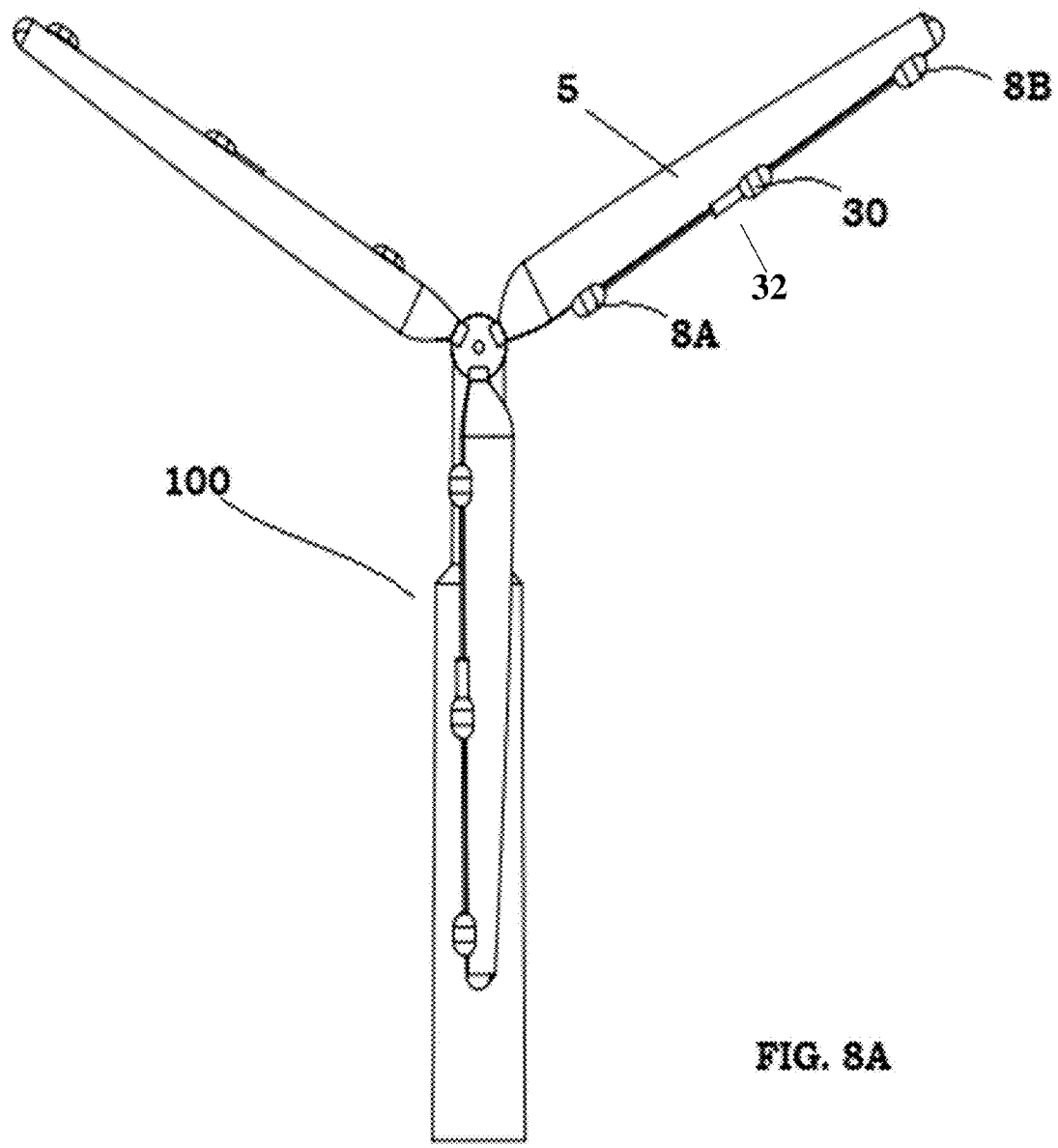
FIGS. 8A, 8B and 8C disclose a method of retrofitting of the fluid reservoirs and enclosing it over traditional existing wind turbine propeller blades in accordance with an embodiment of the present invention.
Figure 8B:
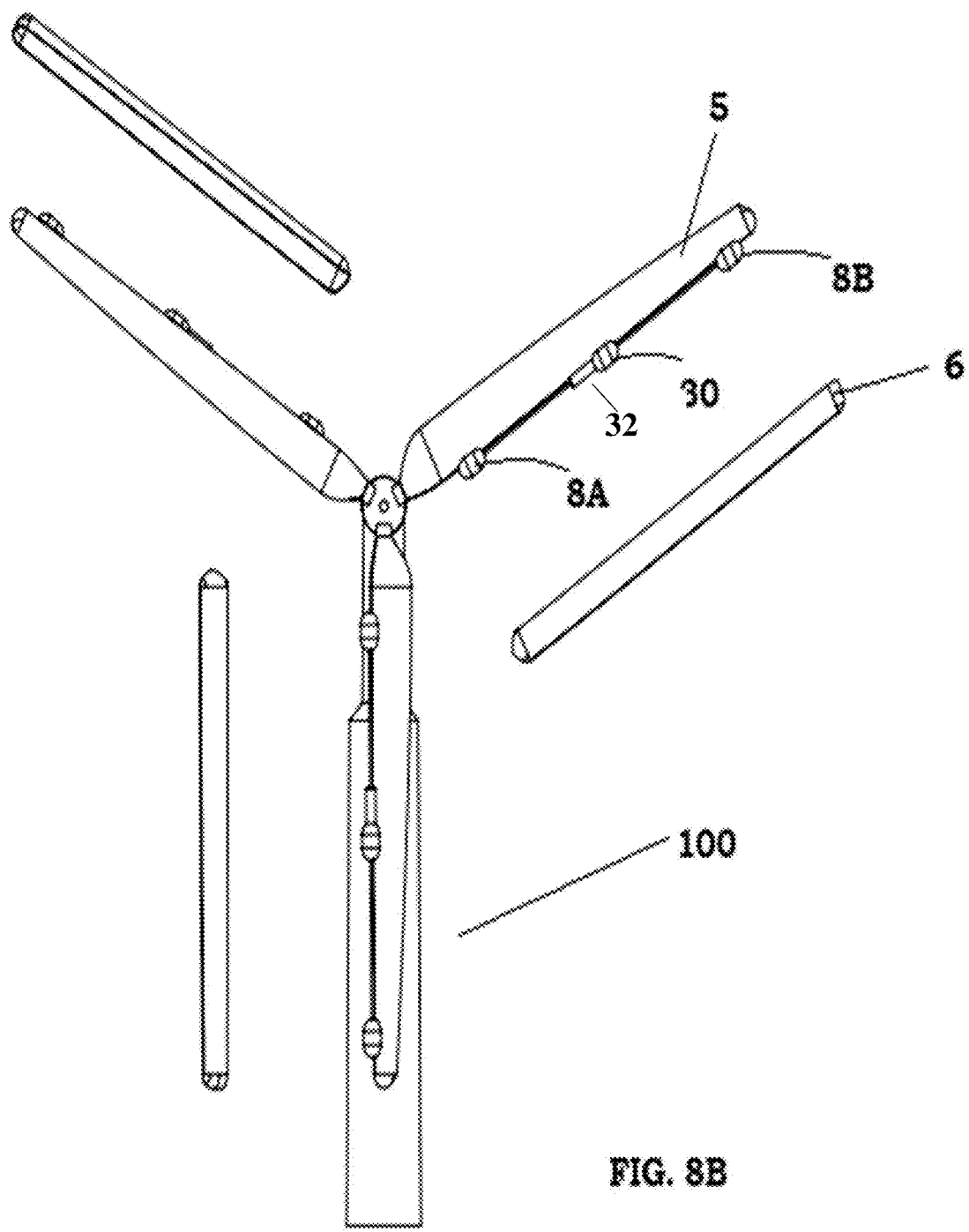
Figure 8C:
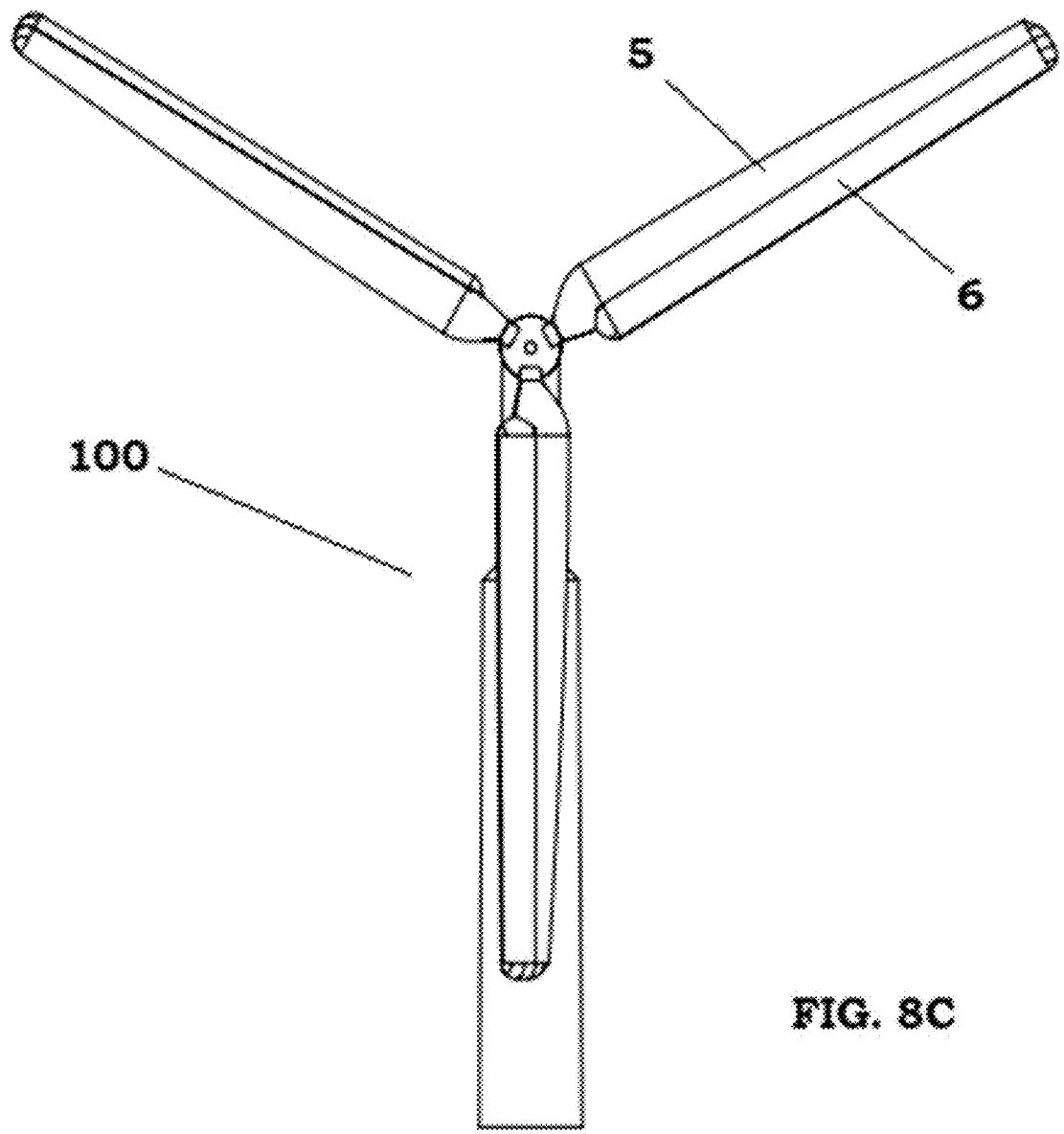

Now referring to FIGS. 8A, 8B and 8C which disclose one or another embodiment of wind turbine 100 with the hollow propeller of present invention made on the conventional existing propellers by retrofitting the fluid reservoirs 8A, 8B and pump assembly 30 over the blades 5 of the conventional propeller and enclosing the retrofitted reservoir 8A, 8B and pump assembly 30 using the enclosing member 6. FIG. 8A discloses a pump 30 and fluid reservoir assembly 8A, 8B attached over the conventional existing propeller blade of wind turbine. FIG. 8B discloses retrofitted pump 30 and the fluid reservoir assembly 8A, 8B over the propeller blades 5 and an enclosing member 6. While the FIG. 8C discloses a propeller blade 5 enclosing member 6 attached over it to enclose the pump 30 and the fluid reservoir assembly 8A, 8B between them to protect from external and environmental problems.

Figure 9:
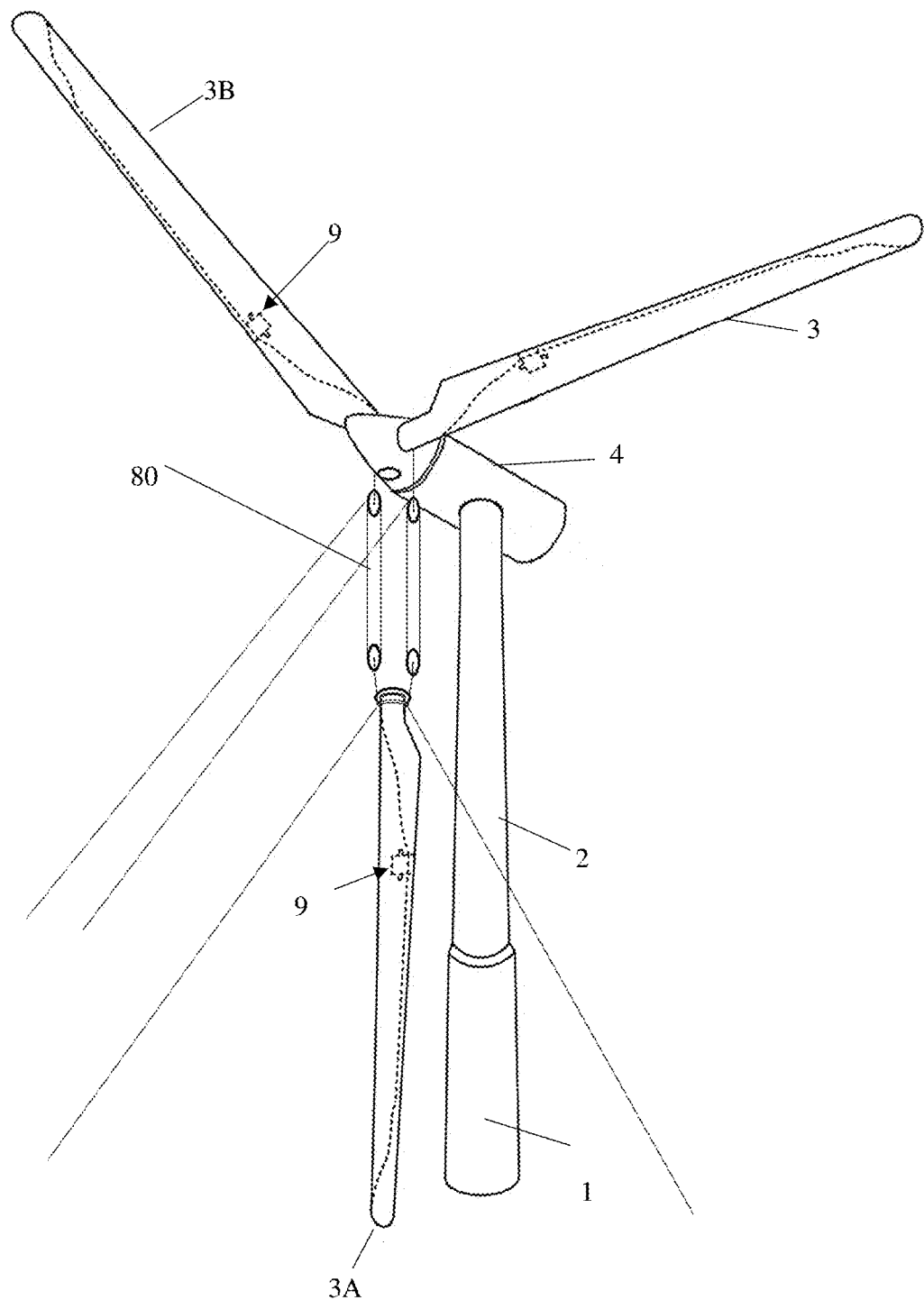
FIG. 9 is an illustration of a method of removing a normal propeller blade and replacing it with a hollow blade of the present invention.

FIG. 9 illustrates a method of retrofitting an existing propeller with the blades 3, 3A, 3B and nacelle 4 of the present invention, which does not require lowering the primary support 1 and the secondary support 2. Instead a crane and/or a pulley system is used comprising metal cable wires 80 to replace the propeller, e.g. with the blades and nacelle of the present invention.

In this or another embodiment, the old propeller is replaced by a new self-contained unit. The new propeller will be shorter and somewhat thicker to accommodate the fluid tank transfers and house the wireless apparatus. The construction, design, form and size of the new propeller is optimized to accommodate the fluid tank transfers and house the wireless apparatus.

In this embodiment, the structural, static, and dynamic properties (e.g. center gravity, center of inertia, etc.) are optimized to fit the local operating conditions of the turbine (e.g. local wind speeds, frequency of gusts, etc. For example, the center of gravity and the center of mass must be identical and that each location is evaluated by ANSYS © for wind history to adjust for centripetal (inward) and centrifugal (outward) forces. The amount of fluid within the hollow blades will be different for each location to resolve these forces. These forces are similar to an ice skater in rotation drawing the arms closer to the chest for greater rpms. In another example, airplane consumption of fuel moves the fuselage center of mass and gravity in flight and this is why on occasion a passenger is requested a different seat to balance the aircraft.

EXEMPLIFICATION

According to an exemplary embodiment, simulation results (ANSYS® analysis) of the wind turbine blade design considers deformation due to aerodynamic loading of a wind turbine blade by performing a transient 2-way FSI (Fluid-Structure Interaction) analysis. The simulation results show that the hollow blade of the wind turbine system is 43.2 m long and starts with a cylindrical shape at the root and then transitions to the airfoils S818, S825 and S826 for the root, body and tip, respectively. This blade was created to be similar in size to a GE 1.5XLE turbine. Due to computation complexity, regarding the size of the grid used to simulate the wind turbine, a scaled down version of the GE 1.5XLE to 10% of the blade diameter was used. The hollow blade of the wind turbine system used has approximately 8 m diameter.

Comparative Results:

In the two cases the simulation results (ANSYS analysis) includes a free rotating turbine without water being injected in the fluid reservoir of the hollow blades and the other one with water injected at the tip of the hollow blade. Table 1 shows that the hollow blade with water being injected to the tip of the only one hollow blade of the three hollow blades, increased the rotation of the propeller by 104% as compared to the blade without water. Below are the operating conditions for the two cases:

Wind Speed: 15 msec=54 km/hr.

Water weight injected: 80~100 Kg

TABLE 1

Free rotating blade without water and rotating blade with water (top weight attached)

| | Free Rotating Blade | Top Weight Attached |
|---|---|---|
| Physical time accomplished | 3.5 seconds | 3.3 seconds |
| Rotation per minute (RPM) | 7.5 rpm | 15.3 rpm |

ANSYS Analysis:

ANSYS analysis was performed for optimizing the design of the blade of the wind turbine in terms of length, diameter, thickness etc.

Varying Thickness Verification:

As a part of the blade analysis, it was desirable to incorporate thickness as a function that varies along the length of the blade. To test if the thickness commands were working properly, the ANSYS results were compared with the theoretical results for the following setup. The geometry consisted of a cantilevered beam with a length of 10 m, a width of 0.5 m and a linearly varying thickness. The root thickness was set to 0.5 m and the thickness at the end was set to 0.1 m. Next, the thicker face (face with 0.5 m×0.5 m dimensions) was fixed while the thin face (face with 0.5 m×0.1 dimensions) was given a transverse load of 100,000N. The theoretical calculations yielded a tip deflection of 0.0918 m. The comparison of ANSYS and theoretical results are summarized in Table 2. Accordingly, it was concluded that thickness commands had been properly implemented and were functioning correctly.

TABLE 2

Varying Thickness Cantilever Beam Verification

| | Tip Deflection |
|---|---|
| ANSYS | 0.091795 m |
| Theoretical | 0.0918 m |

Straight Blade Verification:

As part of the verification process, ANSYS results were compared to theoretical results for a straight, constant thickness wing with no spar. The geometry consisted of an S818 airfoil extruded to a length of 10 m, with a thickness of 0.030 m. Table 3 displays the theoretical and the ANSYS tip displacement results. Note that the ANSYS results are shown for several different mesh sizes in order to show that the results are mesh converged.

TABLE 3

Deformation Validation for Straight Wing, no Spar Case

| | Tip Displacement (m) |
|---|---|
| Theoretical | 0.00448 |
| ANSYS: 481 elements | 0.0048747 |
| ANSYS: 1,088 elements | 0.0046592 |
| ANSYS: 2,525 elements | 0.0045702 |
| ANSYS: 9,000 elements | 0.0045237 |

Straight Blade with Spar Verification:

Next, a simulation was carried out for a straight blade with a spar. The geometry consisted of the S818 airfoil extruded to a 10 m length and given a thickness of 0.020 m. The spar was given a thickness of 0.050 m. Table 4 below displays the theoretical and ANSYS results for tip deflection. Once again, the ANSYS simulations were ran on different meshes to show mesh convergence and explore the precision of resulting numerical values.

TABLE 4

Deformation Validation for Wing with Spar Case

| | Tip Displacement (m) |
|---|---|
| Theoretical | 0.307 |
| ANSYS: 1216 elements | 0.2864 |
| ANSYS: 2125 elements | 0.2824 |

Full Blade Verification:

The purpose of the last verification was to test out the full wind turbine blade geometry. Table 5 shows how the ANSYS results compare to theoretical results. The results showed that the stress in many areas around the root section is around 20 MPa.

TABLE 5

Root Stress Validation for Full Blade

| | Maximum Stress MPa |
|---|---|
| Theoretical | 19.6 |
| ANSYS | 20 |

Full Blade ANSYS Implementation:

This section will serve to describe how the full blade simulation was created in ANSYS. The full blade simulation was created in ANSYS in terms of geometry, meshing, material properties and thickness, loading, and optimization. Thus, the optimal spar thickness for the blade of the present wind turbine system is a constant 10 cm and the optimal skin thickness is a linearly varying function with a root thickness of 30 mm and a tip thickness of 10 mm.

After performing the ANSYS® simulation, the blade of the present wind turbine system was effectively modeled and optimized to minimize material use while maximizing material and design specifications.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Or, the technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 5%), As used herein, the term "substantially" refers to approximately the same shape as stated.

While several embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of embodiments.

Trademarks: the product names used in this document are for identification purposes only; and are the property of their respective owners.

What is claimed is:

1. A wind turbine system for continuous motion of a turbine; the wind turbine system comprising:
    a hollow propeller having a plurality of hollow blades connected to a central hub;
    at least one fluid reservoir configured within each of the plurality of hollow blades, each fluid reservoir located at a tip and at a stem near the central hub of the hollow propeller, wherein the at least one fluid reservoir is capable of collecting and storing a fluid;
    at least one wirelessly operated pump configured within each of the plurality of hollow blades, wherein the at least one wirelessly operated pump is connected to the at least one fluid reservoir by a fluid line for transferring the fluid back and forth within the at least one fluid reservoir;
    at least one wireless control unit communicatively coupled with the at least one wirelessly operated pump to control the action of the at least one wirelessly operated pump;
    at least one wireless shaft rotation monitor sensor attached to a propeller shaft and configured to monitor and transmit angle and position of the propeller shaft to the at least one wireless control unit; and
    at least one anemometer attached at a rear portion of a nacelle of the wind turbine system and configured to monitor and transmit speed of wind to the at least one wireless control unit;
    wherein the at least one wirelessly operated pump is configured to:
        pump the fluid into the at least one fluid reservoir at the top of the rotation cycle as a counterweight resulting in movement of the hollow propeller downwards, in a low or a no wind condition;
        pump the fluid out of the at least one fluid reservoir at the lowest point of the hollow propeller's rotation revolution to complete a cycle; and
        to manipulate the fluid within the at least one fluid reservoir to slow down the hollow propeller in reverse condition when the hollow propeller is at a maximum critical speed.

2. The wind turbine system of claim 1, wherein the at least one fluid reservoir creates an imbalance of weight at top of the hollow propeller to keep the hollow propeller moving in a circular motion.

3. The wind turbine system of claim 1, wherein an imbalance is created by transferring the fluid from a first fluid reservoir being one of the at least one fluid reservoir into an another fluid reservoir being another one of the at least one fluid reservoir of the plurality of hollow blades.

4. The wind turbine system of claim 1, wherein each of the plurality of hollow blades of the hollow propeller are configured to have the at least one fluid reservoir, and the at least one wirelessly operated pump with the at least one wireless control unit self-contained within a connection unit.

5. The wind turbine system of claim 1, only one of the plurality of hollow blades is required to be activated to pump the fluid at a time.

6. The wind turbine system of claim 1, further comprising a reserve tank within the nacelle and configured to be connected with the at least one fluid reservoir configured within each of the plurality of hollow blades.

7. The wind turbine system of claim 6, wherein the reserve tank is configured to collect the fluid from all the at least one fluid reservoir configured within each of the plurality of hollow blades when no external effort for the motion of the hollow propeller is required.

8. The wind turbine system of claim 6, further comprising a heating mechanism configured to heat the fluid to prevent the fluid from freezing in one or more of: the reserve tank within the nacelle; the at least one fluid reservoir; and the at least one wirelessly operated pump.

9. The wind turbine system of claim 1, further comprising a rechargeable battery disposed within the hollow propeller and configured to power the at least one wirelessly operated pump.

10. The wind turbine system of claim 1, wherein the hollow propeller comprises a pair of symmetrical long blades and a pair of symmetrical short hollow blades in between the pair of symmetrical long blades.

11. The wind turbine system of claim 1, wherein the at least one fluid reservoir and the at least one wirelessly operated pump are configured to be retrofitted within at least one conventional blade of the hollow propeller using an enclosing member.

12. A method of working of a wind turbine, the method comprising:
    providing a wind turbine system comprising:
        a hollow propeller having a plurality of hollow blades connected to a central hub;
        at least one fluid reservoir configured within each of the plurality of hollow blades, each fluid reservoir located at a tip and at a stem near the central hub of the hollow propeller, wherein the at least one fluid reservoir is capable of collecting and storing a fluid;
        at least one wirelessly operated pump configured within each of the plurality of hollow blades, wherein the at least one wirelessly operated pump is connected to the at least one fluid reservoir by a fluid line for transferring the fluid back and forth within the at least one fluid reservoir;
        at least one wireless control unit communicatively coupled with the at least one wirelessly operated pump to control the action of the at least one wirelessly operated pump;
        at least one wireless shaft rotation monitor sensor attached to a propeller shaft and configured to monitor and transmit angle and position of the propeller shaft to the at least one wireless control unit; and
        at least one anemometer attached at a rear portion of a nacelle of the wind turbine system and configured to monitor and transmit a speed of wind to the at least one wireless control unit;
    pumping the fluid into the at least one fluid reservoir at the top of the rotation cycle as a counterweight resulting in movement of the hollow propeller downwards, in a low wind condition;
    pumping the fluid out of the at least one fluid reservoir at the lowest point of the hollow propeller's rotation revolution to complete a cycle; and
    manipulating the fluid within the at least one fluid reservoir to slow down the hollow propeller in reverse condition when the hollow propeller is at a maximum critical speed.

13. The method of working of the wind turbine of claim 12, wherein pumping of the fluid at the top of the at least one fluid reservoir aids in the counterweight to increase an angular momentum driving weight of the hollow propeller and accelerating the speed towards the downward direction.

14. The method of working of the wind turbine of claim 12, wherein repetition of each revolution filling and emptying the at least one fluid reservoir sequentially in the hollow propeller rotation at a desired position according to the hollow propeller location occurs to keep the wind turbine continuously rotating even in low wind condition or a no wind condition.

15. The method of working of the wind turbine of claim 12, wherein the method further includes heating the fluid to a temperature to prevent the wind turbine system from freezing.

16. The method of working of the wind turbine of claim 12, further comprising a reserve tank within the nacelle and configured to be connected with the at least one fluid reservoir configured within each of the plurality of hollow blades.

17. The method of working of the wind turbine of claim 16, wherein the reserve tank is configured to collect the fluid from all the at least one fluid reservoir configured within each of the plurality of hollow blades when no external effort for the motion of the hollow propeller is required.

18. The method of working of the wind turbine of claim 12, further comprising a rechargeable battery disposed within the hollow propeller and configured to power the at least one wirelessly operated pump.

* * * * *